Nov. 7, 1950  R. FUCHS  2,529,011

BELT-ELEVATOR OVERLOAD THROWOUT CLUTCH

Filed Nov. 19, 1946

INVENTOR:
Rudolf Fuchs
by Sommers + Young
Attorneys

Patented Nov. 7, 1950

2,529,011

UNITED STATES PATENT OFFICE 2,529,011

BELT-ELEVATOR OVERLOAD THROWOUT CLUTCH

Rudolf Fuchs, Weinfelden, Switzerland, assignor to Gebruder Buhler, Uzwil, Switzerland Application November 19, 1946, Serial No. 710,878
In Switzerland November 1, 1945

Section 1, Public Law 690, August 8, 1946
Patent expires November 1, 1965

3 Claims. (Cl. 192—56)

Belt elevators in flour mills, silos and the like, are often the cause of fires which are liable to sweep the entire plant. When the elevators run full or the belt is stretched due to a break-down or overload, the bucket belt is locked and comes to a standstill, while the driven belt pulley is still engaged by the drive and tends to continue its rotation. The bucket belt thereby may be subjected to an excessive friction and even set on fire, and often the entire wooden elevator building may be destroyed by fire.

A plurality of devices have been made known, designed to warn the attendants or operators by acoustic or visual means or to bring in to operation safety measures for preventing a fire.

The overload throw-out clutch according to the present invention, is of such design as to prevent belt failure and danger of fire in case of a stopped belt. To such end, the hub of the fast belt pulley is mounted on a bushing which is positively secured to the drive shaft, and elements are provided for coupling the said hub and bushing and, in combination with a driver element, designed to disengage the coupling elements in case of a stopped belt so as to allow the bushing to freely rotate in the hub while the hub is standing still.

Figure 1:
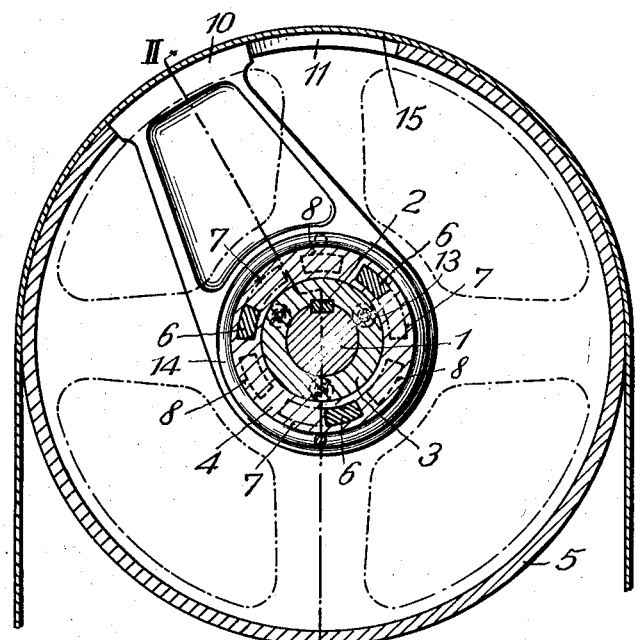
Figure 2:
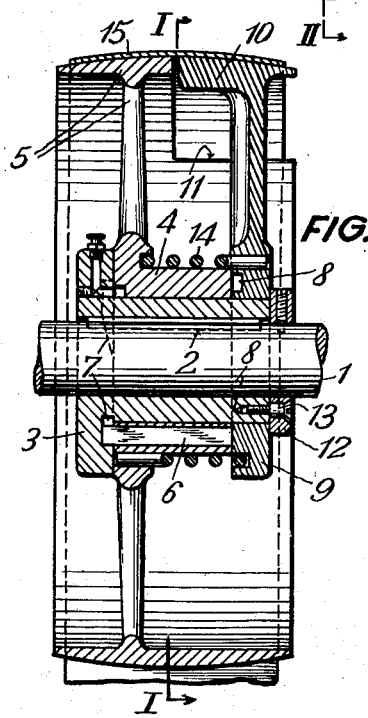

One form of invention is shown, by way of example, in the accompanying drawing, in which Fig. 1 is a side sectional view of a pulley and belt on line I—I of Fig. 2.

Fig. 2 a section on line II—II of Fig. 1, and

Figure 3:
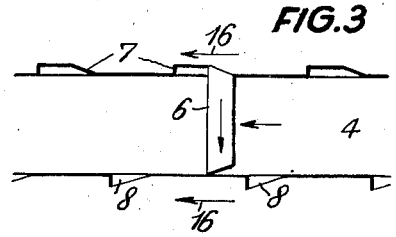
Figure 4:
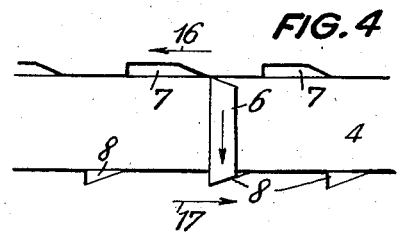
Figure 5:
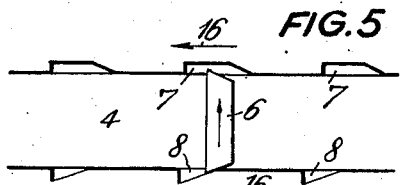

Figs. 3-5 are schematic representations of different operating stages of the coupling elements.

A bushing 3 is keyed, at 2, to the driving shaft 1. Hub 4 of a belt pulley 5 is rotatably mounted on bushing 3 and houses three coupling keys 6 which are axially displaceable. The left-hand ends (Fig. 2) of the said keys extend into recesses 7 provided in bushing 3. The right-hand ends (Fig. 2) of keys 6 engage in recesses 8 provided in the hub portion 9 of a segment-shaped driver 10 which is rockable within a segment-shaped recess 11 of belt pulley 5. In normal operation the segment-shaped member 10 will come into contact with the conveyor belt during each rotation of pulley 5, in the same manner as each other peripheral portion of the pulley 5. Hub portion 9 is secured against axial displacement on bushing 3 by a set collar 12 fixedly attached to bush 3 by screws 13. A restoring torsion-spring 14 is anchored at one end to hub 4 of pulley 5 and, at the other end, to hub portion 9 of driver 10. The bucket belt 15 runs over pulley 5.

The operation of the protective device, shown in Figs. 1 and 2, is illustrated by means of the schematical Figs. 3-5 wherein a coupling key 6 and the recesses 7 in bushing 3, as well as the recesses 8 in hub portion 9 of driver 10 are diagrammatically illustrated.

In the elevator operating position shown in Fig. 3, bushing 3 keyed to driving shaft 1 rotates in the direction of arrow 16. The coupling keys 6 disposed in hub 4 of belt pulley 5, at one end are all engaged in the recesses 7 of bushing 3, hub 4 being driven thereby in the direction of the center arrow. Driver 10 is in its position of rest (shown in Fig. 1), being held therein by torsion spring 14. The other ends of all keys 6 abut against the inside face of driver hub portion 9.

In case of a service interruption, Fig. 4, belt pulley 5 slips with respect to bucket belt 15, driver 10 moving in recess 11 (Fig. 1) relatively to pulley 5 in the direction of arrow 17. A recess 8 of driver hub portion 9 thus will be brought opposite to a key 6, the latter thus being snapped into the said recess 8. Belt pulley 5 has now become disengaged from shaft 1, and the latter, together with bushing 3, will idle or run free up to the moment when bucket belt 15, due to releasing the discharge slide of the elevator foot or due to the removal of the fault or interference, is turned slightly backward due to overbalancing effect of the loaded side of the belt. Thereby driver 10 is positioned out of the contact range of belt 15, even shortly before assuming a horizontal position, so that bucket belt 15 no longer is supported on driver 10. At this moment, the latter again is turned relative to belt pulley 5 in the direction of arrow 16 (Fig. 5).

Thus, the change from service interruption to operative position is effected as illustrated in Fig. 5. When driver 10 and hub portion 9 undergo a relative rotation, the beveled face of recess 8 pushes key 6 against bushing 3, pin 6 thus being snapped into a recess 7 when being positioned opposite such latter. Belt pulley 5 thus is again coupled to bushing 3 and shaft 1, and the elements automatically are restored into the operative position shown in Fig. 3.

In the clutch according to this invention there may be provided one pin and a plurality of recesses, or when a plurality of pins are provided for example three as described and shown in Fig. 1, the number of recesses may be either equal to the number of pins, or the number of recesses may be a multiple of the number of pins. All the pins are arranged to function together and are moved simultaneously in and out of clutching engagement.

What I claim and desire to secure by Letters Patent is:

1. A clutch adapted to automatically disengage and re-engage a drive pulley of a conveyor belt with respect to a drive shaft, comprising a bushing keyed to the said shaft, a pulley having a hub rotatably mounted on said bushing and having a belt-contacting rim, a segmental pulley arm having a hub also mounted rotatably on the said bushing, the belt-contacting rim of the pulley having a segmental recess into which said arm extends into contact with the belt, said recess being of greater peripheral extent than the arm, whereby when the belt is locked against movement the arm moves in said recess, spring means operatively interconnecting said driving pulley and segmental pulley arm for restoring the latter relative to the former, the said bushing and segmental-pulley hub being provided with circularly spaced recesses on their opposite faces, the pulley hub having circularly spaced longitudinal parallel bores extending entirely therethrough, a plurality of keys slidably fitting in said bores and extending into the recesses of either the bushing or hub of the segmental pulley arm to operatively interconnect either the driving pulley with the driving shaft or the segmental pulley-arm with the driving pulley, whereby the normally engaged driving pulley is disengaged from the driving shaft to idle when the elevator belt is overloaded and is re-engaged automatically upon removal of the cause of such overload.

2. A clutch according to claim 1 and in which the said recesses in the bushing and segmental-pulley arm are both provided with beveled abutment faces, and in which the said keys are provided with beveled end faces adapted to co-operate with the said abutment faces for the purpose of engaging the keys and driving-pulley hub either with the said bushing and driving shaft or with the segmental-pulley arm.

3. A clutch according to claim 1, in which the said spring means is in form of a restoring spring adapted to turn the segmental pulley arm rearward in the said segmental recess of the pulley rim relative to the pulley when said pulley is turned slightly rearward due to overbalancing by the loaded reach of the belt upon removal of the cause of the overload.

RUDOLF FUCHS.

REFERENCES CITED

The following references are of record in the file of this patent:

UNITED STATES PATENTS

| Number | Name | Date |
|---|---|---|
| 629,651 | Brenzinger | July 25, 1899 |
| 979,104 | Smith | Dec. 20, 1910 |
| 1,213,199 | Houseman | Jan. 23, 1917 |